United States Patent [19]

Ando et al.

[11] Patent Number: 5,719,336
[45] Date of Patent: Feb. 17, 1998

[54] CAPACITIVE ACCELERATION SENSOR

[75] Inventors: Mitsuhiro Ando, Toyohashi; Eiji Horiba, Tokyo, both of Japan

[73] Assignee: Aisin Seiki Kabushiki Kaisha, Kariya, Japan

[21] Appl. No.: 647,746

[22] Filed: May 15, 1996

[30] Foreign Application Priority Data

May 28, 1995 [JP] Japan ............... 7-119416

[51] Int. Cl.$^6$ ............... G01P 15/125
[52] U.S. Cl. ............... 73/514.32; 73/514.38
[58] Field of Search ............... 73/514.32, 514.18, 73/514.36; 361/280

[56] References Cited

U.S. PATENT DOCUMENTS

| | | | |
|---|---|---|---|
| 4,922,756 | 5/1990 | Henrion | 73/514.18 |
| 4,932,261 | 6/1990 | Henrion | 73/514.18 |
| 5,205,171 | 4/1993 | O'Brien et al. | 73/514.32 |
| 5,350,189 | 9/1994 | Tsuchitani et al. | 73/514.32 |
| 5,383,364 | 1/1995 | Takahashi et al. | 73/514.36 |
| 5,392,651 | 2/1995 | Suzuki et al. | 73/514.32 |
| 5,406,848 | 4/1995 | Okada | 73/514.32 |
| 5,429,736 | 7/1995 | Shimada et al. | 73/514.32 |
| 5,492,020 | 2/1996 | Okada | 73/514.32 |
| 5,594,171 | 1/1997 | Ishida et al. | 73/514.36 |

FOREIGN PATENT DOCUMENTS

| | | | |
|---|---|---|---|
| 4-299227 | 10/1992 | Japan | 73/514.32 |
| 5-203667 | 8/1993 | Japan | . |
| 5-249138 | 9/1993 | Japan | . |

OTHER PUBLICATIONS

"Diode Integrated Capacitive Accelerometer with Reduced Structural Distortion", Y. Shoji et al., Transducers '95—Eurosensors IX, The 8th International Conference on Solid-State Sensors and Actuators, and Eurosensors IX, Stockholm, Sweden, Jun. 25–29, 1966, pp. 581–584.

*Primary Examiner*—Cristine K. Oda
*Attorney, Agent, or Firm*—Burns, Doane, Swecker & Mathis, LLP

[57] ABSTRACT

A seismic mass 41 is supported by a beam 37 which has opposite ends secured to a housing 11 so that its gravity center G is positioned away from a straight line connecting the opposite ends the beam 37. Thus, a rotating force is given to the seismic mass 41 in response to an acceleration. The rotating force given to the seismic mass 41 causes displacement of the beam 37. Then, a capacitance between a movable electrode 43, 45 and a fixed electrode 21, 23, 25, 31, 33, 35 changes, and such a change defines a magnitude of the acceleration.

5 Claims, 9 Drawing Sheets

CAPACITIVE ACCELERATION SENSOR

BACKGROUND OF THE INVENTION

1. Field of the Invention

This invention relates to a capacitive acceleration sensor for detecting the magnitude of acceleration based on capacitance change. It is applicable to an air bag system, an active suspension system for a vehicle and a posture control for a robot.

2. Description of Related Art

There are conventionally known a strain gage sensor, a piezoresistance sensor and so on used as the acceleration sensor. However, its characteristics depend on temperature condition and its accuracy is affected by temperature change. Therefore, a capacitive acceleration sensor comes to be used as the acceleration sensor since it is hardly influenced by the temperature change.

Japanese Laid Open Patent Publication No. 5-203667 shows an example of such sensor.

The sensor disclosed in the Publication has plural pairs of electrodes, each pair being composed of a movable electrode formed on a surface of a seismic mass and a fixed electrode facing the movable electrode. The sensor converts acceleration of three axis directions into three displacement components of the seismic mass so as to detect them as capacitance change between the electrodes.

However, the movable electrodes are provided in plural while being separated from each other, so that, when a lead is located there, a problem of stray capacitances of the lead occurs. In addition, the structure is complicated and manufacturing cost is high. Moreover, the lead needs to be located at a place where mechanical displacement takes place, so that the lifetime of the lead tends to be short.

SUMMARY OF THE INVENTION

In view of the above, it is an object of the invention to provide a capacitive acceleration sensor that has a simple structure, is hard to be affected by the stray capacitances and provides long lifetime with low manufacturing cost.

In accordance with one preferred mode of the invention, there is provided a capacitive acceleration sensor comprising: a fixed part; an elastic beam having opposite ends secured to the fixed part; a seismic mass supported by the beam so as to have a center of gravity positioned away from a straight line connecting the opposite ends of the beam; a movable electrode, having a predetermined area, formed on one surface of the seismic mass; and a fixed electrode formed on the fixed part so as to face the movable electrode and having substantially the same area as the movable electrode while being divided in a plurality of parts.

Further objects and advantages of the invention will be apparent from the following description, wherein preferred embodiments of the invention are clearly shown.

BRIEF DESCRIPTION OF THE DRAWINGS

FIG. 6b is a circuit diagram showing capacitances formed between the fixed electrodes and moving electrodes of FIG. 6a.

DESCRIPTION OF THE PREFERRED EMBODIMENT

A preferred mode of the invention is described hereafter referring to the drawings.

Figure 1:
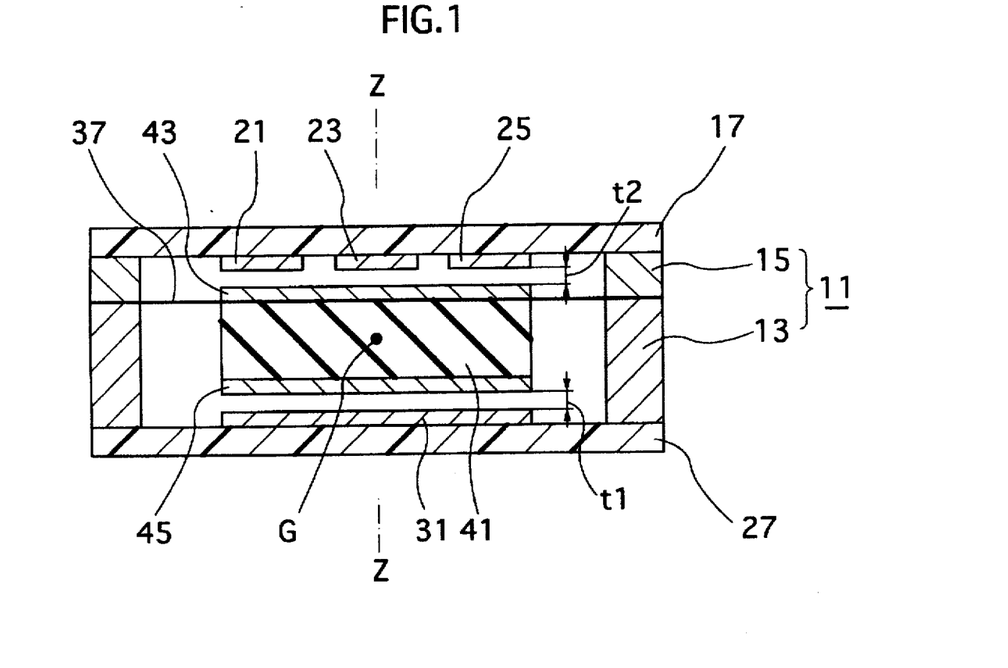
FIG. 1 is a sectional view of a capacitive acceleration sensor according to an embodiment of the invention.
Figure 2:
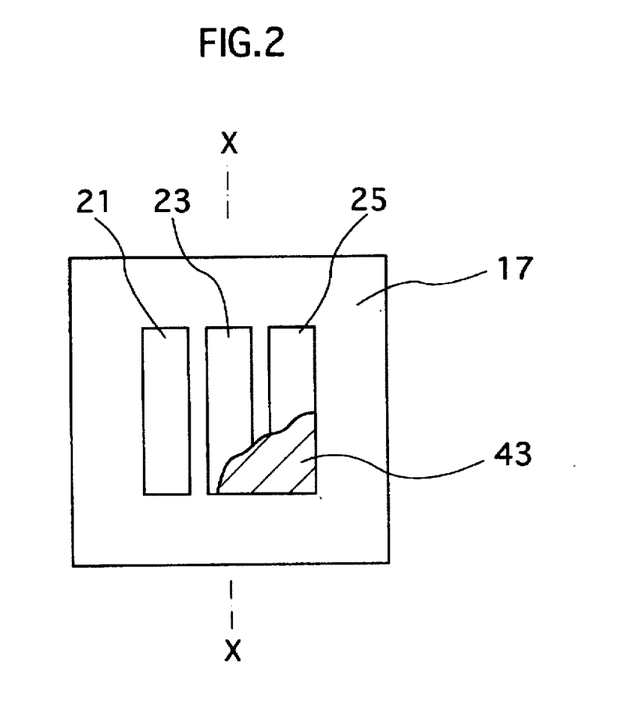
FIG. 2 is an explanatory view showing an arrangement of a first fixed electrode of the capacitive acceleration sensor of the embodiment shown in FIG. 1.
Figure 3:
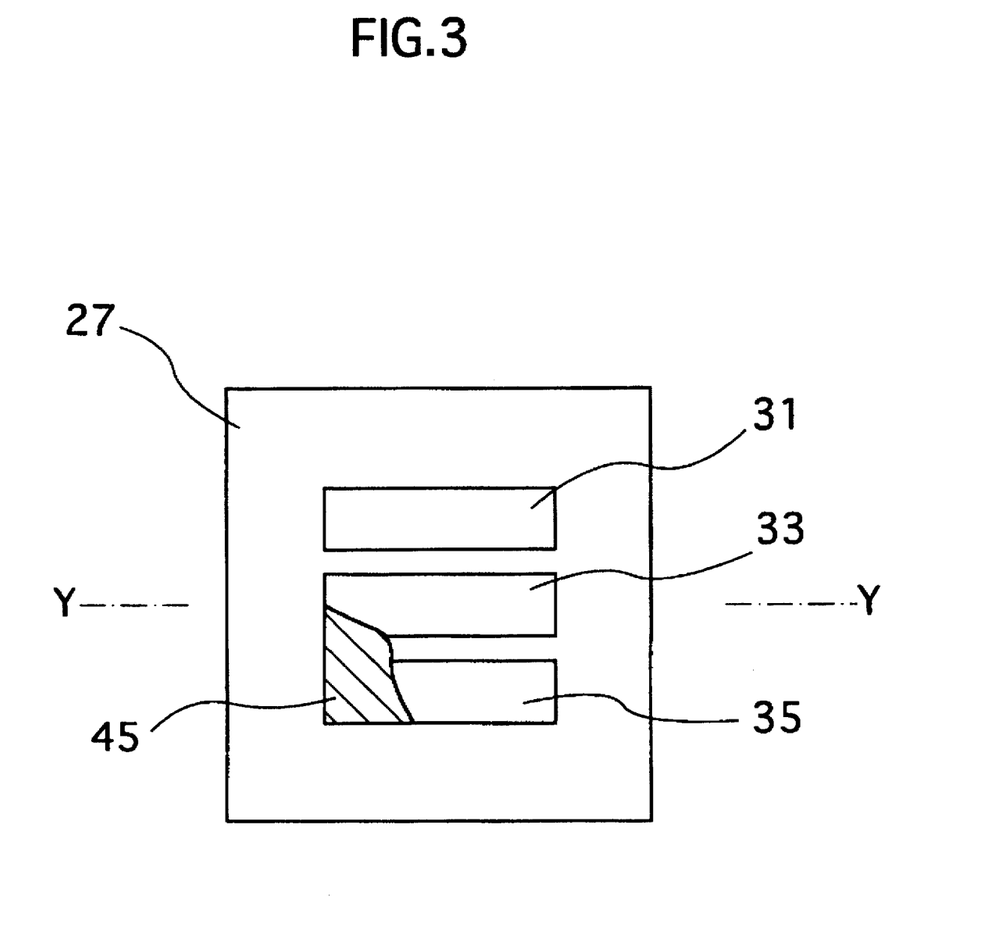
FIG. 3 is an explanatory view showing an arrangement of a second fixed electrode of the capacitive acceleration sensor of the embodiment shown in FIG. 1.
Figure 4A:
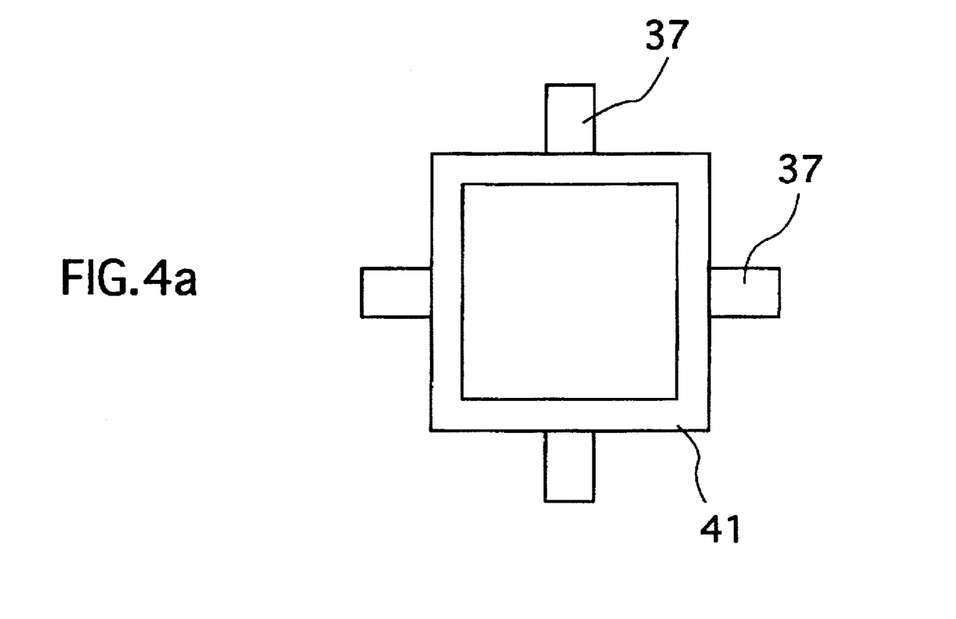
FIG. 4a is an explanatory view showing a relation between a seismic mass and a beam of the capacitive acceleration sensor of the embodiment shown in FIG. 1.

FIG. 1 illustrates a section of a capacitive acceleration sensor according to a first embodiment of the invention. FIG. 2 shows an arrangement of the upper electrodes, in plan view, of the sensor of FIG. 1. FIG. 3 shows an arrangement of the lower electrodes, in plan view, of the sensor of FIG. 1. FIG. 4a shows a relation between a seismic mass and a beam, in plan view, of the sensor of FIG. 1.

In the figures, a housing 11 is formed of a main body 13 and an auxiliary body 15 into a square frame. The main body 13 constitutes a main part of the housing 11. The auxiliary body 15 is used for fitting beams 37. Namely, the beam 37 is sandwiched and fixed stably between the main body 13 and the auxiliary body 15. The main body 13 and the auxiliary body 15 are firmly joined to each other with uniform pressure as a whole by using an adhesive or a screw not shown, thereby holding the beam 37 therebetween. An insulating substrate 17 is composed of an insulating material such as a synthetic resin plate, a glass plate and so on. The substrate 17 is also made into a plane board shape having a high plane accuracy.

A first fixed electrode is divided in three parts 21, 23 and 25 which are disposed on an inner surface of the substrate 17 in lines. The first part 21, second part 23 and third part 25 are respectively formed into the same width and arranged in parallel to each other. The second part 23 has the same center line X—X as the center line X—X of the housing 11, as shown FIG. 2, and is symmetrical about the line X—X. The fixed electrode parts 21, 23 and 25 are formed by evaporation, sputtering or printing on the insulating substrate 17. The fixed electrode parts 21, 23 and 25 are firmly secured to the insulating substrate 17 so as to face the inside of the housing 11.

In the same way, a second fixed electrode is divided into three parts 31, 33 and 35 which are disposed on an inner surface of an insulating substrate 27 in three rows. The substrate 27 is composed of a flat plate of insulating material having high plane accuracy. The first part 31, second part 33 and third part 35 are respectively formed into the same width. The second part 33 of the second fixed electrode has a center line Y—Y crossing at right angles to the center line X—X of the housing 11 as shown in FIG. 3. The second part 33 is symmetrical about the center line Y—Y. The second fixed electrode parts 31, 33 and 35 are formed by evaporation, sputtering or printing on the insulating substrate 27. The second fixed electrode parts 31, 33 and 35 are firmly secured to the insulating substrate 27 so as to face the inside of the housing 11.

As shown in FIG. 4a, the beam 37 is elastic and has a shape of plane board or flat strip. The beams 37 are disposed parallel to the side surfaces of the housing 11, so as to extend along or be parallel to the center line X—X and the center line Y—Y of the housing 11.

Figure 4B:
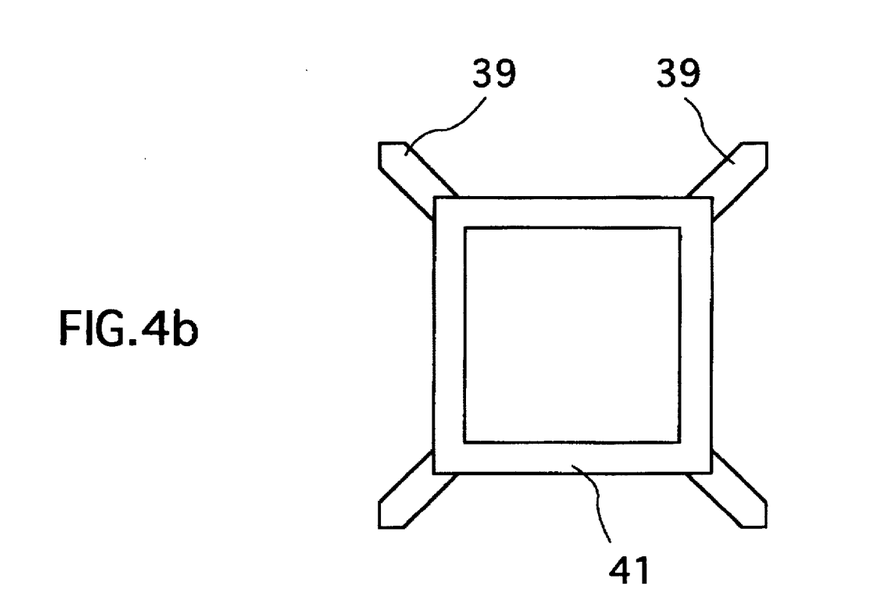
FIG. 4b is an explanatory view showing a relation between a seismic mass and a modified beam of an inventive capacitive acceleration sensor.

FIG. 4b illustrates a modified example of beams 39. The beams 39 are fixed between the main body 13 and the auxiliary body 15 in the same manner and disposed so as to connect the four inside corners of the housing 11. Namely the beams extend along the diagonal lines of the housing 11 and are inclined to the center line X—X and the center line Y—Y at an angle of 45 degrees. It is noted that the beams 37 and the beams 39 may be equally and alternatively used in the present invention.

A seismic mass 41 is supported by the beams 37. The seismic mass 41 is made of an insulating material of uniform mass distribution and has a predetermined weight. The center of gravity of the seismic mass 41 is positioned at its center or the crossing point of the beams 37 when seen in plan view of FIG. 4a, while being positioned at its center when seen from the front side of FIG. 1. Both thickness side surfaces of the seismic mass 41 are flat and parallel to the first fixed electrode parts 21, 23 and 25 and the second fixed electrode parts 31, 33 and 35. A first movable electrode 43 and a second movable electrode 45 are formed on the opposite surfaces of the seismic mass 41. The larger the mass or weight of the seismic mass 41, the better the detecting accuracy is. Therefore, if a desired mass or weight cannot be obtained by an insulating material alone, it is effective to use a seismic mass which has a whole part or at least a center portion made of iron or lead, while covering such metal part with an insulating layer. Another seismic mass may be made of a plate of iron or lead, while covering the metal plate with an insulating layer. In the above structures, the first movable electrode 43 and the second movable electrode 45 are mounted on the insulating layer. In this case, the first movable electrode 43 and the second movable electrode 45 are usually formed by evaporation, sputtering or printing, too.

In a usual state, the first movable electrode 43 and the first fixed electrode parts 21, 23 and 25 face parallel to each other with a uniform clearance t1. The second movable electrode 45 and the second fixed electrode parts 31, 33 and 35 face parallel to each other with a uniform clearance t2, too. The clearance t1 and the clearance t2 are usually equal to each other. The outer circumferential lengths of the first movable electrode 43 and the first fixed electrode 21, 23, 25 are equal. The outer circumferential shapes of the second movable electrode 45 and the second fixed electrode 31, 33, 35 are equal, too. The dimensions and shapes of the outer circumferences of the movable and fixed electrodes are the same and conformed to each other, as shown in FIGS. 2 and 3. While, in the present embodiment, the outer circumferential lengths of the first movable electrode 43 and the first fixed electrode 21, 23, 25 are set equal, while the outer circumferential lengths of the second movable electrode 45 and the second fixed electrode 31, 33, 35 are equal, in practicing the invention, it is enough that such lengths and shapes substantially correspond to each other. Nevertheless, it is necessary that the center of the first movable electrode 43 corresponds to the center of the first fixed electrode 21, 23, 25, and that the center of the second movable electrode 45 corresponds to the center of the second fixed electrode 31, 33, 35.

Here, the electrodes 21, 23, 25, 31, 33, 35, 43 and 45 can be formed on the insulating substrate 17 and 27, respectively, by using the manufacturing technique for the multilayer printed board, while being provided with leads by through holes, not shown, which are formed on the insulating substrates 17 and 27. In case leads are drawn out of the rear surfaces of the first fixed electrode parts 21, 23, and 25 and the second fixed electrode parts 31, 33 and 35 via such through holes, stray capacitances can be restricted to the minimum, and the joined part is given improved seal. Of course, it is possible to draw out leads from the front surface of the fixed electrode parts 21, 23, 25 31, 33 and 35.

Shield electrodes may be arranged at a fixed interval around the first fixed electrode parts 21, 23 and 25 and the second fixed electrodes 31, 33 and 35 for the purpose of preventing an error due to stray capacitances. However, in the present embodiment, such an element is omitted.

Figure 5:
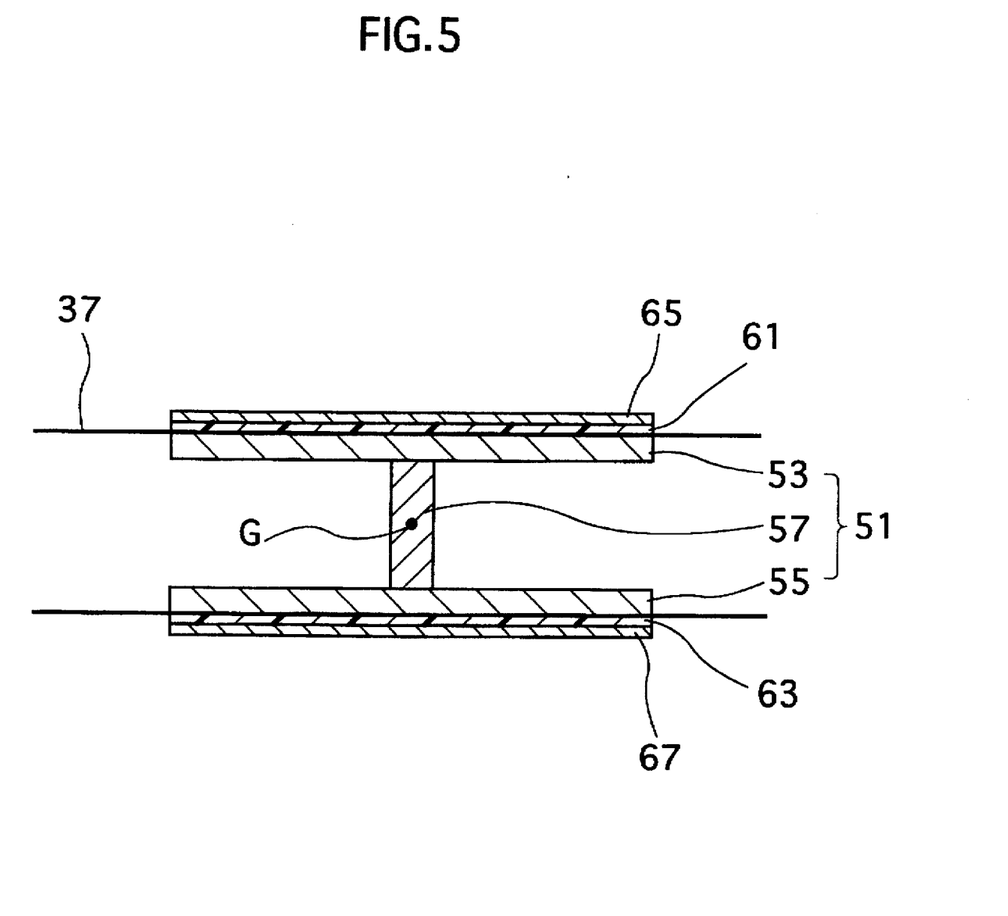
FIG. 5 is an explanatory view showing a relation between a modified seismic mass and a beam of an inventive capacitive acceleration sensor.

FIG. 5 illustrates a section of a modified seismic mass 51 in side view, while showing a relation between the seismic mass and the beam 37.

In this modification, the seismic mass 51 is made of a pair of metal square plates having a fixed thickness which are connected by a metal. Namely, a mass plate 53 and a mass plate 55 are arranged at both sides of a metal pillar 57 and fixed thereto. The center of gravity G of the seismic mass 51 is located at the center of the metal pillar 57. Insulating layers 61 and 63 are formed respectively on the outside surfaces of the mass plates 53 and 55. A first movable electrode 65 and a second movable electrode 67 are provided on the outside surfaces of the insulating layers 61 and 63. The modified seismic mass 51 can function in the same way as the seismic mass 41, and they may be used alternatively.

Figure 6A:
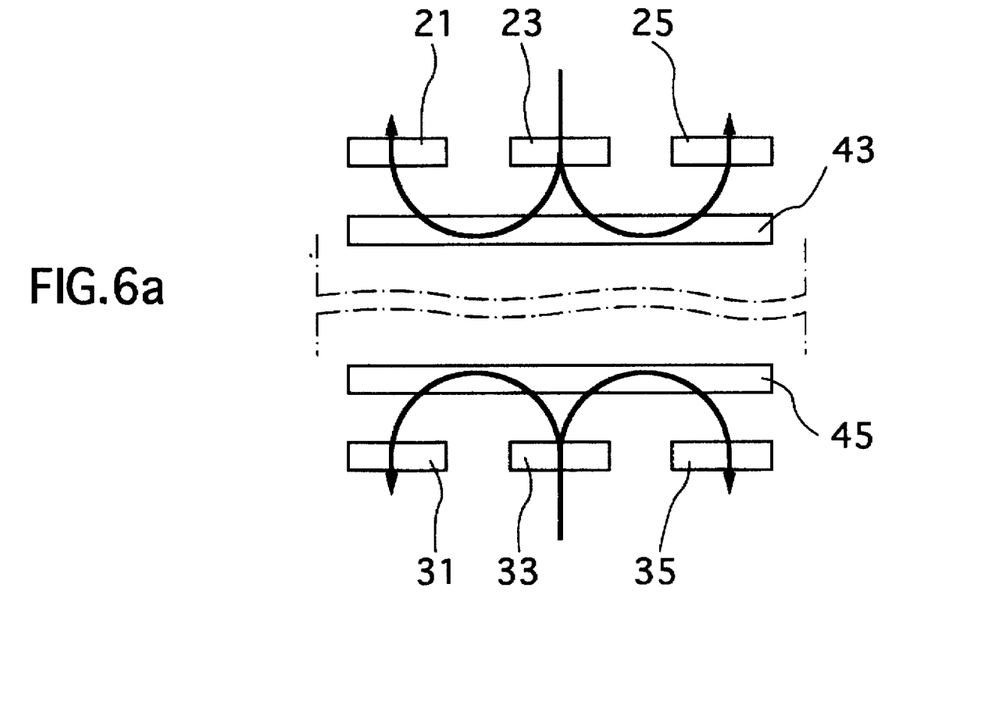
FIG. 6a is an explanatory view showing a relation between movable electrodes and fixed electrodes of the capacitive acceleration sensor of the embodiment of the invention.
Figure 7:
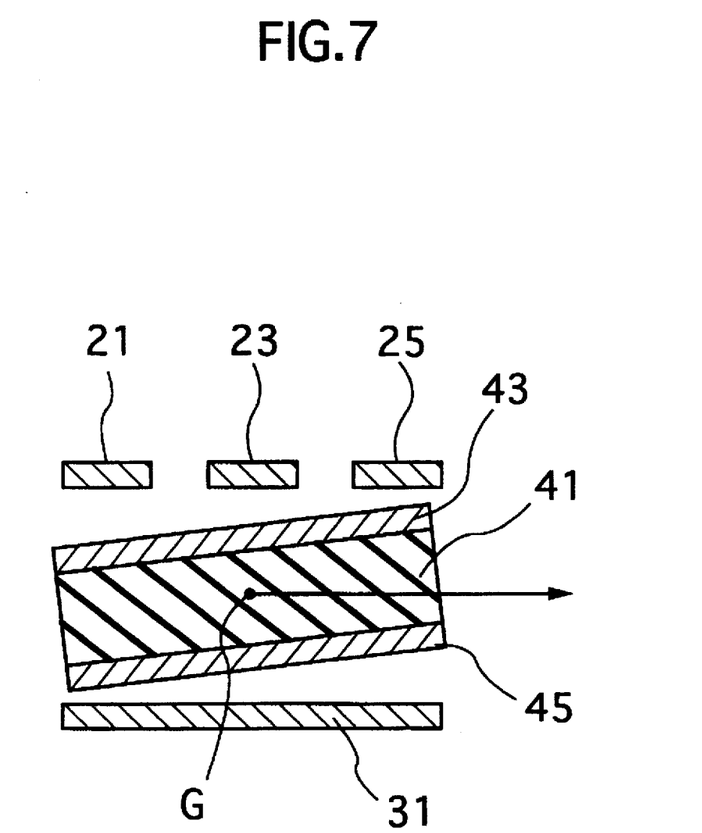
FIG. 7 is an explanatory view showing a relation between a first movable electrode and a first fixed electrode when a seismic mass rotates.

FIG. 6a shows a relation between the first movable electrode 43 and the first fixed electrode 21, 23, 25 as well as a relation between the second movable electrode 45 and the second fixed electrode 31, 33, 35. In FIG. 6a, though the second fixed electrode parts 31, 33 and 35 are illustrated while rotated 90 degrees from its original position, and seen as if they are aligned with the first fixed electrode parts 21, 23 and 25, only for convenience sake, the actual arrangement is such that the first and second fixed electrode parts are crossed at right angles as described above. Capacitances C3a, C3b and C3c are formed between the first movable electrode 43 and the first fixed electrode parts 21, 23 and 25, respectively. Capacitances C5a, C5b and C5c are formed between the second movable electrode 45 and the second fixed electrode parts 31, 33 and 35, respectively. FIG. 7 shows a positional relation between the first movable electrode 43 and the first fixed electrode parts 21, 23 and 25 when the seismic mass 41 rotates. The second movable electrode 45 has the same positional relation to the second fixed electrode parts 31, 33 and 35 as shown in FIG. 7, so that its description is omitted.

Figure 6B:
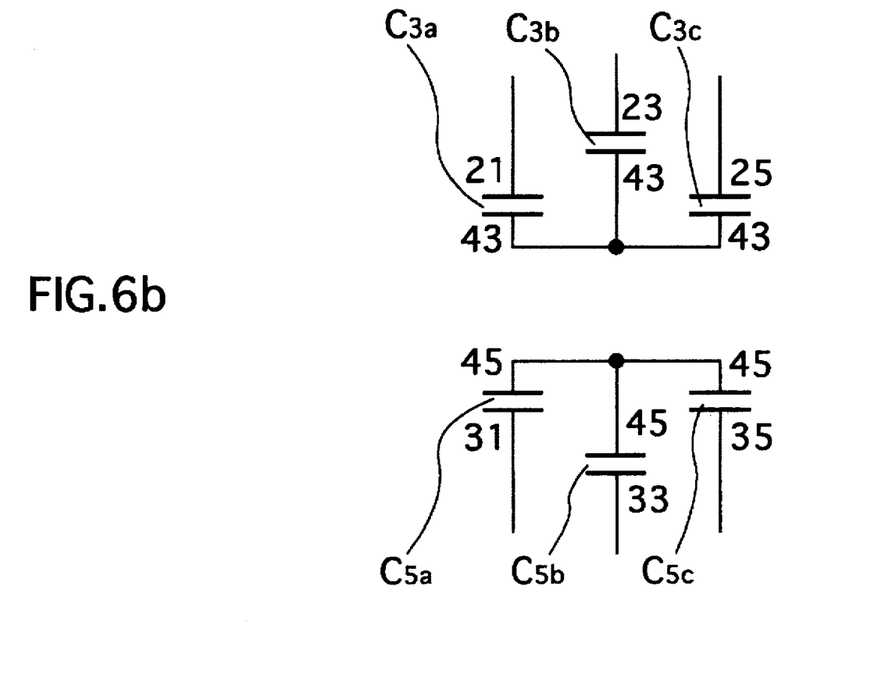

Referring to FIGS. 6a and 6b, since the first movable electrode 43 and the first fixed electrode parts 21, 23 and 25 face each other, capacitances C3a, C3b and C3c are generated between them.

As shown in FIG. 7, when the seismic mass 41 rotates about the gravity center G, an integrated value of the clearance t2 between the movable electrode 43 and the second part 23 of the first fixed electrode is unchanged and the capacitance C3b therebetween is constant, since the second part 23 is symmetrical about its center line, which is parallel to the center line X—X of the housing 11. However, the clearance t2 between the first movable electrode 43 and the first part 21 of the first fixed electrode changes, while the clearance t2 between the first movable electrode 43 and the third part 25 of the first fixed electrode changes oppositely. Thus, the capacitances C3a and C3c formed therebetween vary according to the rotating direction of the seismic mass 41, respectively.

Namely, when the seismic mass 41 is rotated by the acceleration in the right and left direction of FIG. 1 (rotated about the X-axis shown in FIG. 2), the clearance t2 between the first movable electrode 43 and the first part 21 of the first fixed electrode and the clearance t2 between the first movable electrode 43 and the third part 25 of the first fixed electrode change oppositely. More in detail, one of the electrode parts 21 and 25 moves toward the electrode 43, the other electrode part moves away therefrom. Accordingly, the capacitance C3a and the capacitance C3c vary vice versa, depending on the rotating direction of the seismic mass 41. If one of the capacitances C3a and C3c increases, the other capacitance decrease.

However, an average of the clearance t1 between the second movable electrode 45 and each of the second fixed electrode parts 31, 33, 35 does not change. Namely, since the electrode parts 31, 33, 35 extends along the Y-axis direction, average clearance is kept equal to the original shown in FIG. 1. Accordingly, none of the capacitances C5a, C5b and C5c changes even if the seismic mass 41 is rotated about the X-axis by the acceleration.

When the seismic mass 41 is rotated by the acceleration in the paper thickness direction of FIG. 1 (rotated about the Y-axis shown in FIG. 3), the clearance t1 between the second movable electrode 45 and the first part 31 of the second fixed electrode and the clearance t1 between the second movable electrode 45 and the third part 35 of the second fixed electrode change oppositely. More in detail, one of the electrode parts 31 and 35 moves toward the electrode 45, the other electrode part moves away therefrom. Accordingly, the capacitance C5a and the capacitance C5c vary vice versa, depending on the rotating direction of the seismic mass 41. If one of the capacitances C5a and C5c increases, the other capacitance decreases.

However, an average of the clearance t2 between the first movable electrode 43 and each of the first fixed electrode parts 21, 23, 25 does not change. Namely, since the electrode part 21, 23, 25 extends along the X-axis direction, average clearance is kept equal to the original shown in FIG. 1. Accordingly, none of the capacitances C3a, C3b and C3c changes even if the seismic mass 41 is rotated about the Y-axis by the acceleration.

When the seismic mass 41 is moved up and down by the acceleration in the vertical direction of FIG. 1 (Z-axis direction), the clearance t2 between the first movable electrode 43 and each of the first fixed electrode parts 21, 23 and 25 change in the same way. The capacitance C3a and the capacitance C3c change depending on the moving direction of the seismic mass 41. At the same time, the clearance t1 between the second movable electrode 45 and the second fixed electrode parts 31, 33 and 35 change in the opposite way to the above, and the capacitances C5a, C5b and C5c change accordingly. However, this case is different from the above two cases in that the first fixed electrode part 3a and the first fixed electrode part 3c, and the second fixed electrode part 5a and the second fixed electrode part 5c have equal value (containing their codes) in the capacitance respectively.

Namely, in case of acceleration in the right and left, and forward and backward directions of FIG. 1, the first part 21 and the third part 25 of the first fixed electrode have the same clearance t2 to the first movable electrode 43, and the capacitances C3a and C3c are equal. Moreover, the integrated values thereof are the same including their plus or minus sign. Similarly, the first part 31 and the third part 35 of the second fixed electrode have the same clearance t1 to the second movable electrode 45, and the capacitances C5a and C5c are equal. Moreover, the integrated values thereof are the same including their plus or minus sign.

Namely, the X-axis accelerations at the first part 21 and the third part 25 of the first fixed electrode have equal absolute values and only their plus and minus signs are opposite. Similarly, the Y-axis accelerations at the first part 31 and the third part 35 of the second fixed electrode have equal absolute values and only their signs (plus or minus) are opposite. Thus, if the accelerations in opposite directions are subtracted from one another, detected signals are twice as large as each absolute value. On the other hand, the Z-axis accelerations at the first part 21 and the third part 25 of the first fixed electrode have equal values. Similarly, the Z-axis accelerations at the first part 31 and the third part 35 of the second fixed electrode have equal values. For example, if the output of the adder circuit 29 is C1 (C1=C3A+C3C), the output of the adder circuit 49 is C2 (C2=C5A+C5C), and the output of the subtracter circuit 30 is C3, the output C3 of the subtracter circuit 30 equals C1 minus C2 (C3=C1−C2).

As described above, the capacitive acceleration sensor in the embodiment of FIG. 1 operates as a three-dimensional acceleration sensor.

Figure 8:
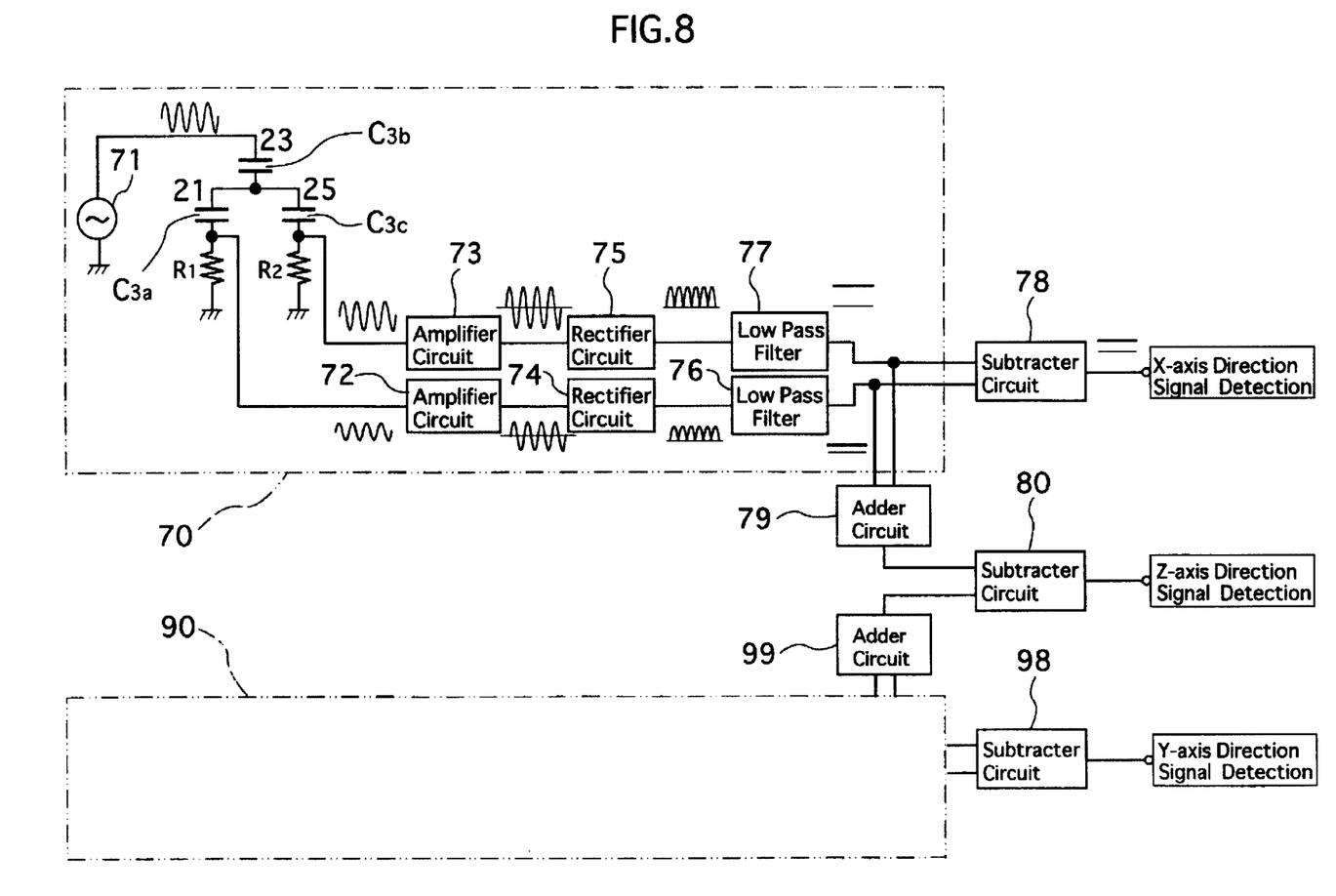
FIG. 8 is a diagram showing a signal detecting circuit for processing capacitances between the movable electrode and the fixed electrode in the embodiment of the invention.
Figure 9:
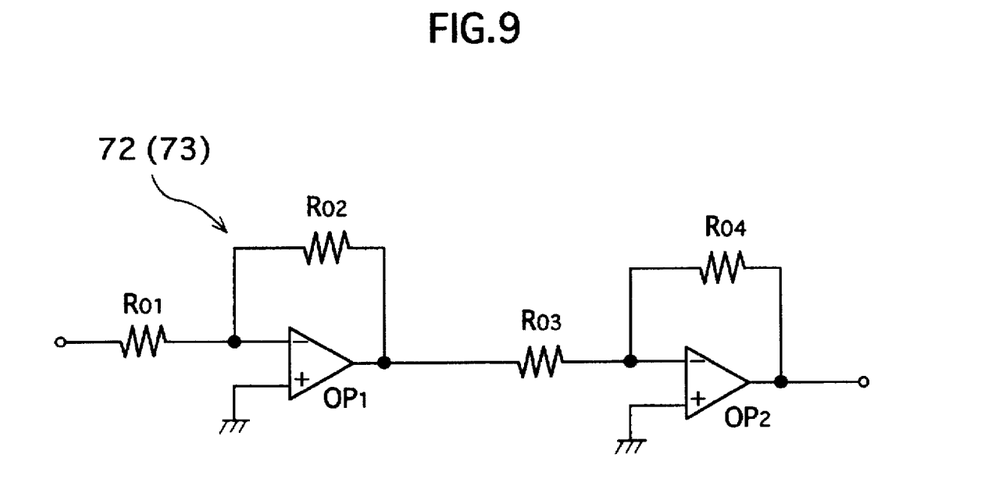
FIG. 9 is a diagram showing an amplifier circuit used in the signal detecting circuit of FIG. 8.
Figure 10:
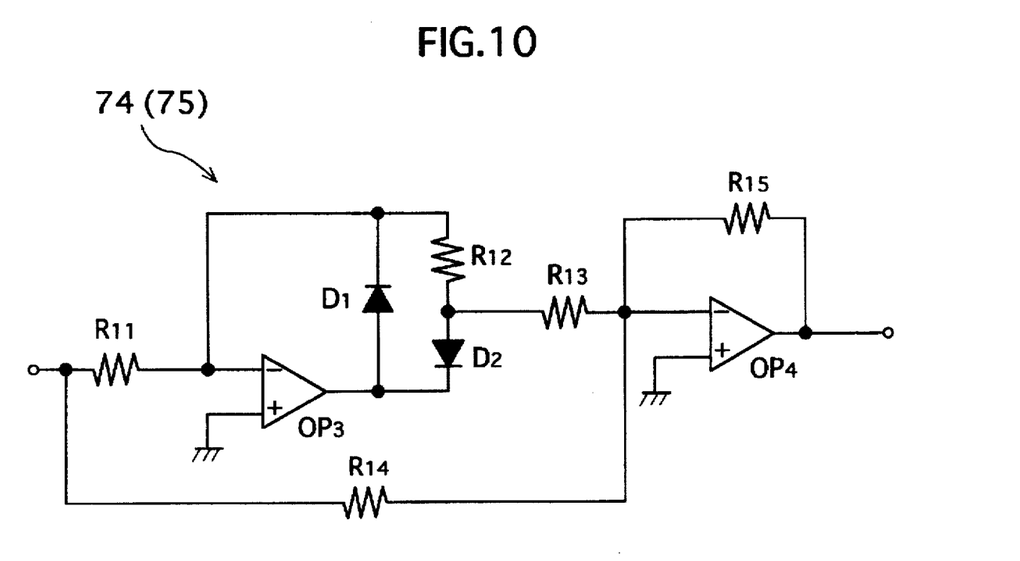
FIG. 10 is a diagram of a rectifier circuit used in the signal detecting circuit of FIG. 8.
Figure 11:
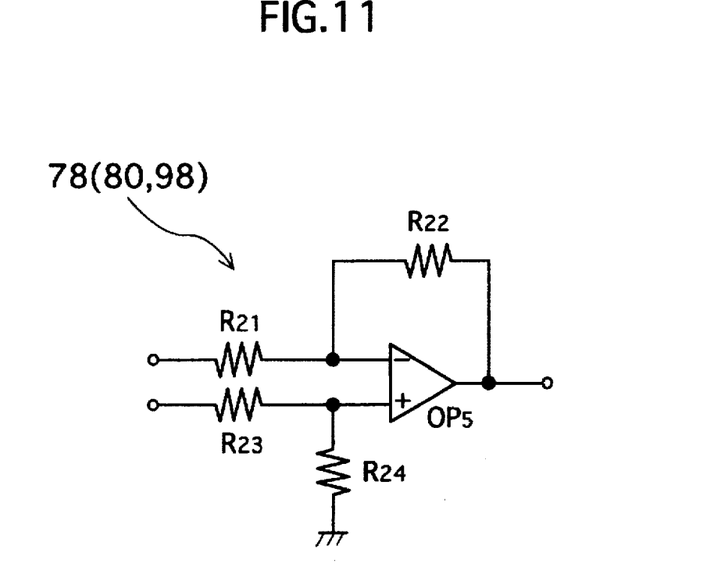
FIG. 11 is a diagram showing a subtracter circuit used in the signal detecting circuit of FIG. 8.
Figure 12:
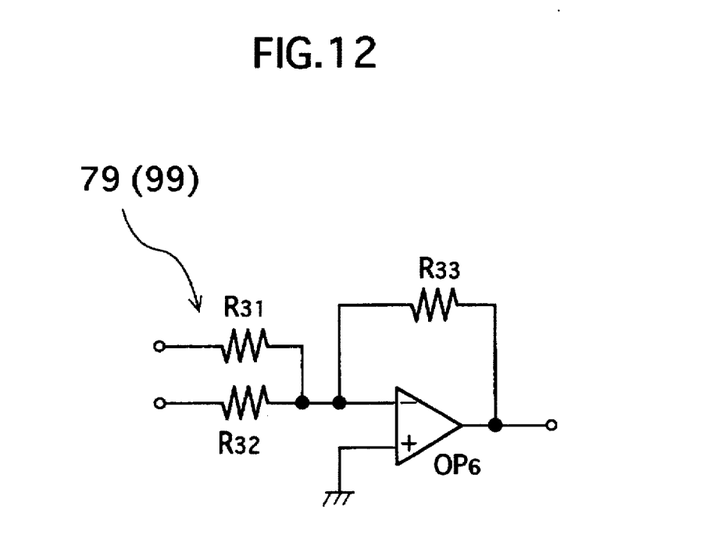
FIG. 12 is a diagram showing an adder circuit used in the signal detecting circuit of FIG. 8.

FIG. 8 shows a signal detecting circuit, for detecting three-dimensional acceleration, of the capacitive acceleration sensor according to the first embodiment of the invention. FIG. 9 shows a detailed example of an amplifier circuit of FIG. 8. FIG. 10 shows a detailed example of a rectifier circuit of FIG. 8. FIG. 11 shows a detailed example of a subtracter circuit FIG. 8. FIG. 12 shows a detailed example of an adder circuit of FIG. 8.

First, the circuits used in the signal detecting circuit of FIG. 8 will be described in brief.

Referring to FIG. 9, an amplifier circuit 72 has two inverting amplifier circuits serially connected. One of the circuits is composed of a resistance R01, a resistance R02 and an operational amplifier OP1. Another circuit is composed of a resistance R03, a resistance R04 and an operational amplifier OP2. An amplifier circuit 73 has the same structure as the amplifier circuit 72.

Referring to FIG. 10, a rectifier circuit 74 has a half-wave rectifier circuit and an inverting amplifier circuit. The half-wave rectifier circuit is composed of a resistance R11, a resistance R12, a diode D1, a diode D2 and an operational amplifier OP3. The inverting amplifier circuit is composed of a resistance R13, a resistance R15 and an operational amplifier OP4. Moreover, alternating current input is added to the inverting amplifier circuit via a resistance R14. A rectifier circuit 75 has the same structure as the rectifier circuit 74.

Referring to FIG. 11, a subtracter circuit 78 is composed of a differential input subtracter circuit which has a resistance R21, a resistance R22, a resistance R23, a resistance R24 and an operational amplifier OP5. This circuit outputs a signal obtained by subtracting the signal through the resistance R21 from the signal through the resistance R23. A subtracter circuit 80 and a subtracter circuit 98 have the same structure as the subtracter circuit 78, respectively.

Referring to FIG. 12, an adder circuit 79 is composed of an inverting adder circuit which has a resistance R31, a resistance R32, a resistance R33 and an operational amplifier OP6. This circuit outputs a signal obtained by adding a signal through the resistance R31 to the signal through the resistance R32 while inverting the phase or adding a minus sign thereto. An adder circuit 99 has the same structure as the adder circuit 79.

Low pass filters 76 and 77 are composed of a conventional CR circuit of L-type or π-type.

Next, the signal detecting circuit of FIG. 8 is described hereafter.

Referring to FIG. 8, an oscillator circuit 71 is composed of an oscillator which generates high sine frequency. The oscillator circuit 71 applies its output to the second part 23 of the first fixed electrode. The first part 21 and the third part 25 are connected to the other power source of the oscillator circuit 71, respectively, through a resistance R1 and a resistance R2 which have a common resistance value.

Namely, a terminal voltage of the resistance R1 is detected as a voltage drop of the resistance R1 in a series circuit of the second part 23, first part 21 and the resistance R1. A terminal voltage of the resistance R2 is detected as a voltage drop of the resistance R2 in a series circuit of the second part 23, third part 25 and the resistance R2.

When the X-axis acceleration is generated, a signal is detected as the voltage drop of the resistance R1 via the first part 21 of the first fixed electrode. Such a signal is input into one terminal of the subtracter circuit 78 through the amplifier circuit 72, the rectifier circuit 74 and the low pass filter 76. Another signal is detected as the voltage drop of the resistance R2 via the third part 25 of the first fixed electrode. Such a signal is input into the other terminal of the subtracter circuit 78 through the amplifier circuit 73, the rectifier circuit 75 and the low pass filter 77. The subtracter circuit 78 provides the difference between such two signals processed as above. In this case, these two signals have the same absolute value and their sign is opposite, so that the subtracter circuit 78 outputs the signal twice as large as each signal. Here, such a detected signal is defined as an "X-axis direction detection signal".

A circuit block 90, which has the same components or structure as the circuit block 70, is provided for the second fixed electrode 31, 33, 35, though not shown specifically. In this block, the same processing is carried out as in the block 70.

Namely, when the Y-axis acceleration is generated, a signal is detected as a voltage drop of a resistance for the first part 31 of the second fixed electrode. Such a signal is input into one terminal of the subtracter circuit 98 through a first amplifier circuit, a first rectifier circuit and a first low pass filter. Another signal is detected as a voltage drop of another resistance for the third part 35 of the second fixed electrode. Such a signal is input into the other terminal of the subtracter circuit 98 through a second amplifier circuit, a second rectifier circuit and a second low pass filter. The subtracter circuit 98 provides the difference between such two signals processed as above. In this case, these two signals have the same absolute value and their sign is opposite, so that the subtracter circuit 98 outputs the signal twice as large as each signal. Here, such a detected signal is defined as a "Y-axis direction detection signal".

Moreover, when the Z-axis acceleration is generated, a signal is detected as the voltage drop of the resistance R1 via the first part 21 of the first fixed electrode. Such a signal is input into one terminal of the adder circuit 79 through the amplifier circuit 72, the rectifier circuit 74 and the low pass filter 76. Another signal is detected as the voltage drop of the resistance R2 via the third part 25 of the first fixed electrode. Such a signal is input into the other terminal of the adder circuit 79 through the amplifier circuit 73, the rectifier circuit 75 and the low pass filter 77.

On the other hand, a signal is detected as the voltage drop of the resistance for the first part 31 of the second fixed electrode. Such a signal is input into one terminal of the adder circuit 99 through the amplifier circuit, the rectifier circuit and the low pass filter. Another signal is detected as the voltage drop of the resistance for the third part 35 of the second fixed electrode. Such a signal is input into the other terminal of the adder circuit 99 through the amplifier circuit, the rectifier circuit and the low pass filter. Outputs from the adder circuits 79 and 99 are input into the subtracter circuit 80 and processed by subtraction. The subtracter circuit 80 provides the difference between such two signals. In this case, these two signals have the same absolute value and their sign is opposite, so that the subtracter circuit 80 outputs the signal twice as large as each signal. Here, such a detected signal is defined as a "Z-axis direction detection signal".

While the above embodiment can be used as the two-dimensional or three-dimensional acceleration sensor wherein electrodes are disposed on both surfaces of the seismic mass 41, an electrode may be disposed only on one surface of the seismic mass 41.

As described above, in the capacitive acceleration sensor of the present embodiment, the seismic mass 41 is supported by the elastic beam 37 whose both ends are fixed to the housing 11 as a fixed part, and the gravity center G is positioned separated from the line connecting both the fixed ends of the beam 37. Thus, the seismic mass 41 is given rotating force by the acceleration, and the rotating force given to the seismic mass 41 causes displacement of the beam 37. Then, the capacitance varies between the movable electrodes 43 and 45 and the fixed electrodes 21, 23, 25 and 31, 33, 35. The change of the capacitance is detected as a change of a magnitude of one-dimensional acceleration.

Therefore, the present embodiment of the sensor can function similarly to the conventional sensor with a simple structure. Moreover, it is hard to be affected by the stray capacitances, since all the elements are accommodated inside the housing 11, and its wiring is not located at the movable electrode side. Furthermore, it is easy to form an electrode such as the movable electrode and the divided fixed electrode and so on. Furthermore, the production cost therefor can be reduced and its lifetime is prolonged, since any conductive part is not arranged on the seismic mass 41 as a moving part.

Here, the above embodiment has a pair of movable electrodes 43 and 45 and the first and second fixed electrodes 21, 23, 25 and 31, 33, 35 corresponding thereto. However, one movable electrode means and one fixed electrode means may be disposed on opposite surfaces of the seismic mass 41 and the housing 11 so as to be faced to each other to generate capacitance therebetween, as long as they have substantially the same area while the fixed electrode means is divided in plurality.

Still, if a pair of movable electrode is disposed on opposite sides of the seismic mass 41 and a pair of fixed electrode means is provided on facing parts of the housing 11, the capacitances vary between each of the facing pair of the movable electrode 41 and fixed electrode 21, 23, 25 and comprised of the first movable electrode 43 and the facing pair of the movable electrode 43 and the second fixed electrode 31, 33, 35. The change of the capacitance is detected as a change of magnitude of two-dimensional or three-dimensional acceleration. Namely, two-dimensional or three-dimensional detection is possible.

While, in the above embodiment, each of the fixed electrodes is divided into three in total, while one of the three parts is aligned with the center line of the housing 11, it may be modified in another way as long as the fixed electrode is divided into an odd number of three or more parts while arranging them in line and placing one of them at the center. Namely, any modification is possible as long as side parts are located in series with a center part. In this case, the capacitance of the center part of the fixed electrode does not change even by the rotation of the movable electrode, so that a relation between the rotation angle and the capacitance can be decided univocally.

Moreover, in the above embodiment, the first fixed electrode parts 21, 23 and 25 and the second fixed electrode parts 31, 33 and 35 are crossed at right angles, so that two-dimensional or three dimensional acceleration detection is possible in particular.

The preferred embodiments described herein are therefore illustrative and not restrictive, the scope of the invention being indicated in the appended claims and all variations which come within the meaning of the claims are intended to be embraced therein.

What is claimed is:

1. A capacitive acceleration sensor comprising:

a fixed part;

an elastic beam having opposite ends secured to the fixed part;

a seismic mass supported by the beam so that a center of gravity of the seismic mass is spaced from a straight line connecting the opposite ends of the beam, the seismic mass having a first surface and an opposite second surface;

movable electrodes each having a predetermined area, the movable electrodes including a first movable electrode being provided on the first surface of the seismic mass and a second movable electrode being provided on the second surface of the seismic mass; and a pair of fixed electrodes that includes a first fixed electrode and a second fixed electrode, the first and second fixed electrodes being provided on the fixed part so that the first fixed electrode is positioned in facing relation to the first movable electrode while the second fixed electrode is positioned in facing relation to the second movable electrode, each of the fixed electrodes having substantially the same area as one of the movable electrodes and being divided into an odd number of parts totalling more than two, the parts forming the first fixed electrode being arranged at substantially a right angle with respect to the parts forming the second fixed electrode.

2. A capacitive acceleration sensor according to claim 1, wherein the fixed part includes a main body and an auxiliary body, said elastic beam being secured between the main body and the auxiliary body.

3. A capacitive acceleration sensor according to claim 1, wherein the parts forming the first fixed electrode are arranged in line, one of the parts forming the first fixed electrode being centrally disposed with respect to the other parts forming the first fixed electrode.

4. A capacitive acceleration sensor according to claim 3, the parts forming the second fixed electrode are arranged in line, one of the parts forming the second fixed electrode being centrally disposed with respect to the other parts forming the second fixed electrode.

5. A capacitive acceleration sensor according to claim 4, wherein the fixed part includes a main body and an auxiliary body, said elastic beam being secured between the main body and the auxiliary body.

* * * * *

UNITED STATES PATENT AND TRADEMARK OFFICE
CERTIFICATE OF CORRECTION

PATENT NO. : 5,719,336

DATED : February 17, 1998

INVENTOR(S) : Mitsuhiro ANDO, et al.

It is certified that error appears in the above-indentified patent and that said Letters Patent is hereby corrected as shown below:

[30]   Foreign Application Priority Data

May 18, 1995   [JP]   Japan............................7-119416

Signed and Sealed this

Nineteenth Day of May, 1998

Attest:

BRUCE LEHMAN

*Attesting Officer*   *Commissioner of Patents and Trademarks*